United States Patent
Reagan, Jr. et al.

(10) Patent No.: US 12,440,229 B2
(45) Date of Patent: Oct. 14, 2025

(54) KIDNEY STONE SUCTION TUBE DEVICE AND RELATED METHODS OF USE

(71) Applicants: Robert W. Reagan, Jr., Clinton, NC (US); Stephen Loehr, Chapel Hill, NC (US)

(72) Inventors: Robert W. Reagan, Jr., Clinton, NC (US); Stephen Loehr, Chapel Hill, NC (US)

( * ) Notice: Subject to any disclaimer, the term of this patent is extended or adjusted under 35 U.S.C. 154(b) by 146 days.

(21) Appl. No.: 17/748,350

(22) Filed: May 19, 2022

(65) Prior Publication Data
US 2022/0370085 A1    Nov. 24, 2022

Related U.S. Application Data

(60) Provisional application No. 63/190,517, filed on May 19, 2021.

(51) Int. Cl.
*A61B 17/22* (2006.01)
*A61B 1/307* (2006.01)

(52) U.S. Cl.
CPC .............. *A61B 17/22* (2013.01); *A61B 1/307* (2013.01); *A61B 2017/22079* (2013.01)

(58) Field of Classification Search
None
See application file for complete search history.

(56) References Cited

U.S. PATENT DOCUMENTS

| | | | |
|---|---|---|---|
| 4,619,247 A * | 10/1986 | Inoue | B05B 11/06 600/116 |
| 9,918,728 B2 | 3/2018 | St. George et al. | |
| 10,064,636 B2 | 9/2018 | Honda | |
| 10,828,049 B2 | 11/2020 | Honda et al. | |
| 2004/0064147 A1 * | 4/2004 | Struble | A61M 25/0668 606/129 |
| 2006/0189921 A1 | 8/2006 | Galdonik et al. | |
| 2013/0231677 A1 * | 9/2013 | Carroux | A61B 17/221 606/127 |
| 2016/0095510 A1 * | 4/2016 | Oskin | A61B 1/00128 600/125 |
| 2016/0120557 A1 | 5/2016 | Goddard et al. | |

(Continued)

FOREIGN PATENT DOCUMENTS

| | | |
|---|---|---|
| WO | WO2019152727 A1 | 8/2019 |
| WO | WO2020163536 A1 | 8/2020 |

*Primary Examiner* — Adam Marcetich
*Assistant Examiner* — Katherine-Ph Minh Pham
(74) *Attorney, Agent, or Firm* — Jenkins, Taylor & Hunt, P.A.

(57) ABSTRACT

The subject matter described herein includes a kidney stone suction tube device and related methods of use. According to one example, the disclosed subject matter includes a suction tube device comprising a flexible tubing element comprising a modified suction tube portion characterized as having U-shaped hollow lumen channel and an intra-renal portion characterized as having circular shaped lumen channel. The intra-renal portion of the suction tube device further includes a collection cylinder section configured for storing kidney stone fragments. In addition, the connection of the modified suction tube portion and the collection cylinder section includes a mesh filter element configured to prevent admittance of kidney stones into the modified suction tube portion of the flexible tubing element.

11 Claims, 5 Drawing Sheets

(56) References Cited

U.S. PATENT DOCUMENTS

| | | |
|---|---|---|
| 2017/0136222 A1 | 5/2017 | Hakim et al. |
| 2017/0215964 A1 | 8/2017 | Harrah et al. |
| 2017/0215965 A1 | 8/2017 | Harrah et al. |
| 2018/0271545 A1* | 9/2018 | Preiss ................ A61B 17/3421 |
| 2018/0361126 A1* | 12/2018 | Folan ................... A61M 27/002 |
| 2019/0142443 A1 | 5/2019 | Pereira et al. |
| 2019/0240461 A1 | 8/2019 | Dayton et al. |
| 2020/0060699 A1 | 2/2020 | Honda et al. |
| 2020/0069319 A1 | 3/2020 | Harrah et al. |
| 2020/0352650 A1 | 11/2020 | Chu et al. |
| 2021/0022756 A1 | 1/2021 | Ciulla |
| 2021/0022757 A1 | 1/2021 | Wan |
| 2021/0121188 A1* | 4/2021 | Yurek ................... A61M 1/774 |

* cited by examiner

KIDNEY STONE SUCTION TUBE DEVICE AND RELATED METHODS OF USE

CROSS REFERENCE TO RELATED APPLICATION

The presently disclosed subject matter claims the benefit of U.S. Provisional Patent Application Ser. No. 63/190,517, filed May 19, 2021; the disclosure of which is incorporated herein by reference in its entirety.

TECHNICAL FIELD

The subject matter described herein relates to medical devices adapted for the removal of kidney stones. More particularly, the subject matter described herein relates to a kidney stone suction tube device and related methods of use.

BACKGROUND

At present, several kidney stone removal techniques employ the application of suction in order to collect and remove stone fragments or dust from a patient's body. Notably, the ability to fragment a kidney stone and contemporaneously provide suction within a kidney requires a working channel with a sufficient internal cross-sectional area to accommodate a laser fiber ureteroscope and a suction lumen that allows the kidney stone fragments to be retrieved via suction without clogging the suction lumen. However, the combined cross-sectional areas of these two aforementioned medical devices makes the ureteroscope and suction tube combination too large to reach the kidney via the ureter. More specifically, the internal pathway comprising the urethra, bladder, and ureter is limited in circumferential size, i.e., may not be large enough to facilitate a working channel for both a laser fiber ureteroscope device and a suitable lumen element for applying suction. As such, many ureteroscope and suction tube combinations require an invasive incision into the patient subject body for operation.

Accordingly, there exists a need for an improved kidney stone suction tube device and related methods of use.

SUMMARY

Figure 1:
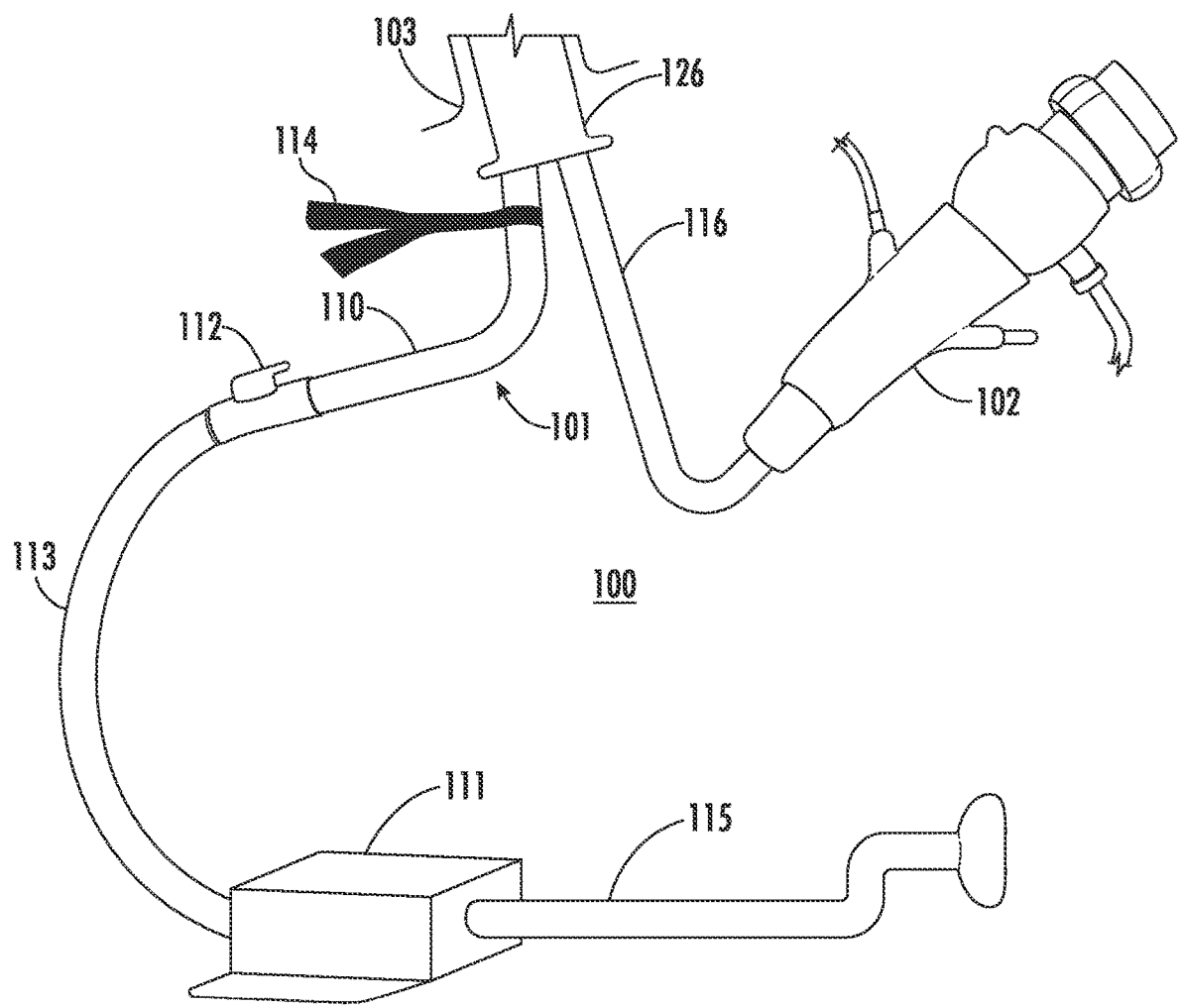
FIG. 1 illustrates an image of an exemplary suction tube device and ureteroscope combination according to an embodiment of the subject matter described herein.

The subject matter described herein includes a kidney stone suction tube device and related methods of use. According to one embodiment, the disclosed subject matter includes a suction tube device comprising a flexible tubing element comprising a modified suction tube portion characterized as having U-shaped hollow lumen channel and an intra-renal portion characterized as having circular shaped lumen channel. The intra-renal portion of the suction tube device further includes a collection cylinder section configured for storing kidney stone fragments. In addition, the connection of the modified suction tube portion and the collection cylinder section includes a mesh filter element configured to prevent admittance of kidney stones into the modified suction tube portion of the flexible tubing element.

According to another aspect of the suction tube device described herein, each of the modified suction tube portion and the intra-renal portion is comprised of plastic or silicone.

According to another aspect of the suction tube device described herein, the flexible tubing element is configured to be inserted into a patient body via a ureteral sheath.

According to another aspect of the suction tube device described herein, the U-shaped channel formation is configured to receive the insertion and/or positioning of a flexible portion of a ureteroscope device within the ureteral sheath.

According to another aspect of the suction tube device described herein, an intra-renal portion of the flexible tubing element includes one or more magnet elements.

According to another aspect of the suction tube device described herein, the one or more magnet elements are configured to magnetically couple with opposing magnet elements positioned on a distal end portion of a ureteroscope device.

According to another aspect of the suction tube device described herein, a surface of the intra-renal portion of the flexible tubing element includes one or more side-port openings to receive at least a portion of the kidney stone fragments and dust.

According to another aspect of the suction tube device described herein, suction applied to the flexible tubing element pulls the kidney stone fragments into the suction tube device.

According to another aspect of the suction tube device described herein, the kidney stone fragments include kidney stone dust and/or sand.

According to another aspect of the suction tube device described herein, a manual shut off valve is configured to cease suction in the flexible tubing element.

According to another aspect of the suction tube device described herein, the U-shaped channel formation is configured to receive the insertion and/or positioning of a flexible portion of a ureteroscope device.

Definitions

The terminology used herein is for the purpose of describing particular embodiments only and is not intended to be limiting of the presently disclosed subject matter. While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a stone" includes a plurality of such stones, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the terms "about" or "approximate" when referring to a value or to an amount of a composition, mass, weight, temperature, time, volume, concentration, percentage, distance, size, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

DETAILED DESCRIPTION

A kidney stone suction tube device and related methods of use are disclosed herein. In particular, the disclosed subject matter presents a minimally-invasive suction tube device capable of being placed in a retrograde fashion through a patient's bladder (via the urethra) and up the bladder and ureter for the intended purpose of suctioning and removing stone fragments from the collecting system of a kidney.

FIG. 1 illustrates an image of an exemplary system comprising a suction tube device and ureteroscope according to an embodiment of the subject matter described herein. Referring to FIG. 1, system 100 includes a suction tube device 101 and a ureteroscope device 102. Notably, suction tube device 101 comprises a flexible tubing element that includes both a "U-shaped" modified suction tube portion 110 and a circular shaped intra-renal portion 125 (shown in FIG. 2). Although a ureteroscope is depicted in FIG. 1, other endoscopic devices may be utilized without departing from the scope of the disclosed subject matter. In some embodiments, system 100 includes a suction hose section 115 that may include a first terminal end that can be attached and/or coupled to a suction port positioned in a wall that is commonly found in an operating room (OR). Alternatively, suction hose section 115 can be connected to some other suction device or any other like machine capable of providing suction for the purposes described herein. Although not depicted in FIG. 1, a suction cannister and/or suction container element can be positioned in between suction hose 115 and the suction port in the wall. Notably, a suction cannister can function as a filter and/or container device that collects kidney stone fragment dust and any stone particles that are small enough to pass through the openings of a mesh filter (e.g., see mesh filter 124 shown in FIG. 2) positioned within suction tube device 101. As such, the suction cannister may thereby prevent the stone fragment dust and particles from entering and/or passing to the suction device or the suction port in the wall.

In some embodiments, a second end of suction hose section 115 may terminate at a suction foot pedal device 111. As used herein, suction foot pedal device 111 may include any type of switching device that can be used by an operator to either turn on, turn off, and/or variably adjust (e.g., throttle) the suction force being applied to suction tube device 101 (via section 115) by the wall suction unit or device. System 100 may further include a suction hose section 113 that is coupled to a port on suction foot pedal device 111 and terminates at an on/off connector valve 112. Although FIG. 1 depicts suction hose section 115 and suction hose section 113 as separate hose elements and/or sections, in some embodiments, suction hose sections 113 and 115 may comprise a single continuous suction hose element that traverses through suction foot pedal device 111. In such embodiments, the application of force on foot pedal device 111 can be configured to cease or throttle the suction power applied to suction hose section 113.

The on/off connector valve 112 may include any switch or valve component that is capable of being accessed and conveniently operated by a user operator. Notably, on/off connector valve 112 can be used by an operator to readily turn the suction on or off in a manual fashion. For example, on/off connector valve 112 can serve as an emergency on/off switch in the event the operation of suction foot pedal device 111 fails. The on/off connector valve 112 may be coupled to a first end of a modified suction tube portion 110 of suction tube device 101 as shown in FIG. 1. As described in greater detail below and illustrated in FIG. 3, modified suction tube portion 110 may include a "C" or "U" shaped hollow lumen opening and a similarly shaped exterior channel structure (vs. a typical circular opening and channel) that is configured to receive and/or accommodate flexible portion 116 of ureteroscope device 102).

In some embodiments, the operator's end of the modified suction tube portion 110 (i.e., of suction tube device 101) can be attached to a surgical drape and/or operating room table to stabilize this external portion end of modified suction tube portion 110 positioned externally from (i.e., outside of) the patient body. For example, a securing element 114 can be attached to modified suction tube portion 110 and likewise clipped, tied, adhered, and/or connected to the surgical drape and/or the operating room table in an attempt to prevent accidental removal or movement after suction tube device 101 is inserted and properly positioned with the patient body.

As indicated above, modified suction tube portion 110 of suction tube device 101 comprises a "U-shaped" suction tubing portion (e.g., see example tube section 302 in FIG. 3) that is notably shaped and configured to receive and/or accommodate a flexible portion 116 of ureteroscope device 102. Specifically, the U-shaped ureteral portion of modified suction tube portion 110 is adapted so that it may be inserted and/or placed through an indwelling ureteral sheath 126 shown in FIG. 1. Although ureteral sheath 126 is depicted in FIG. 1, some embodiments of suction tube device 101 can be configured and/or designed such that the suction tube device may be utilized in the manner described herein without the use of a ureteral sheath. In some embodiments, modified suction tube portion 110 may generally include the shape of tube section 302 shown in FIG. 3. In particular, tube section 302 (e.g., and modified suction tube portion 110 of suction tube device 101) may have an inside diameter of approximately 1.0-1.1 millimeters (i.e., shown as distance 308 in FIG. 3). The outer diameter (i.e., curvilinear measurement from side to side shown as distance 310 in FIG. 3) of tube section 302 may be approximately 3 to 4.5 millimeters. It is understood that distance 308 and distance 310 are exemplary measurements of the modified suction tube portion 110 and do not necessarily restrict the scope of the disclosed subject matter. Further, FIG. 3 further illustrates the U-shaped hollow lumen opening 304 of tube section 302.

Figure 2:
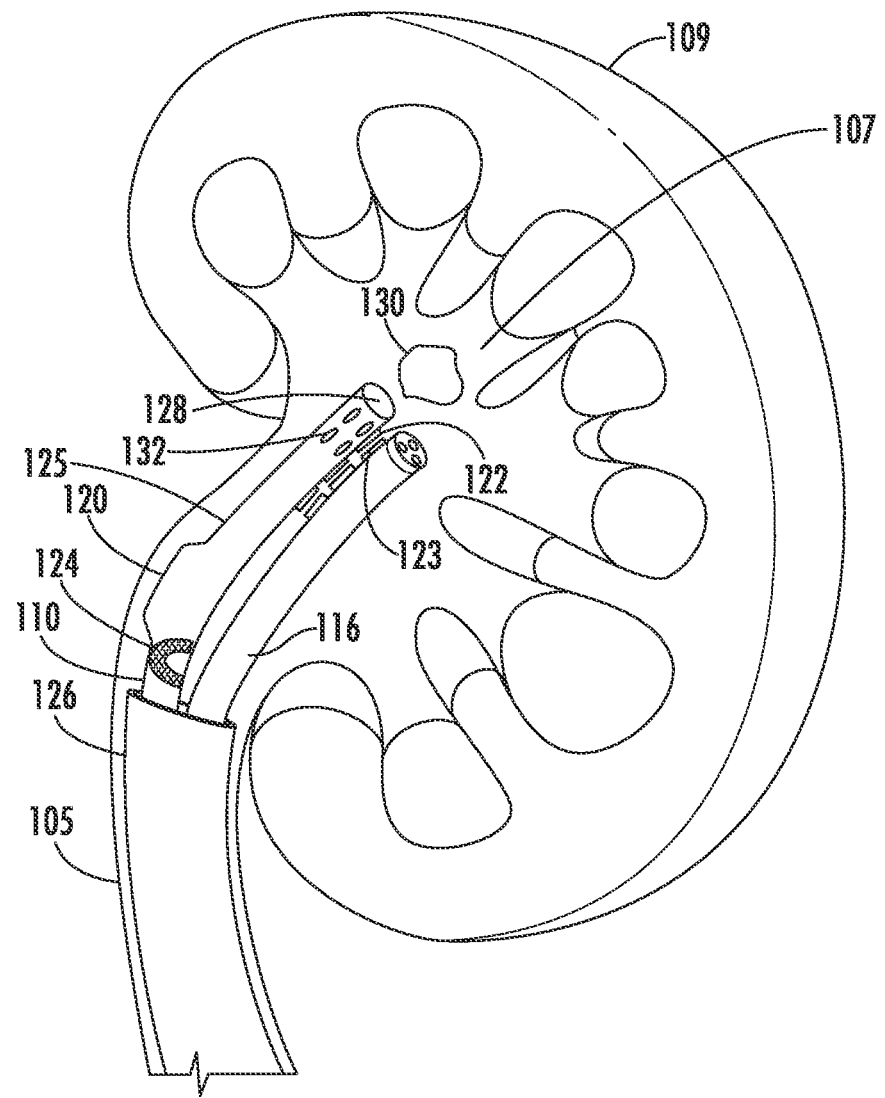
FIG. 2 illustrates an image of the distal ends of the exemplary suction tube device and ureteroscope combination inside a patient kidney according to an embodiment of the subject matter described herein.

FIG. 2 illustrates an image of the distal ends of the exemplary suction tube device and ureteroscope combination inside a patient kidney according to an embodiment of the subject matter described herein. Notably, FIG. 2 illustrates the distal end portion (i.e., intra-renal portion 125) of suction tube device 101 and the distal end portion of flexible portion 116 exiting ureteral sheath 126 and entering renal pelvis area 107 of kidney 109. FIG. 2 further illustrates suction tube device 101 including a collection cylinder 120 that is located at the termination of the modified suction tube portion 110. Notably, the point where modified suction tube portion 110 terminates at collection cylinder 120 is configured with a mesh filter 124.

In some embodiments, the length of modified suction tube portion 110 of the suction tube device 101 may be sized intraoperatively to accommodate the operator's technique and comfort, but in a fashion so that collection cylinder 120 is properly positioned within the renal pelvis area 107 of kidney 109. For example, suction tube device 101 can be approximately 50 centimeters in length. In some embodiments, the length of suction tube device 101 comprises a flexible tubing element that can be constructed of plastic, silicone, or any other flexible material.

Figure 4:
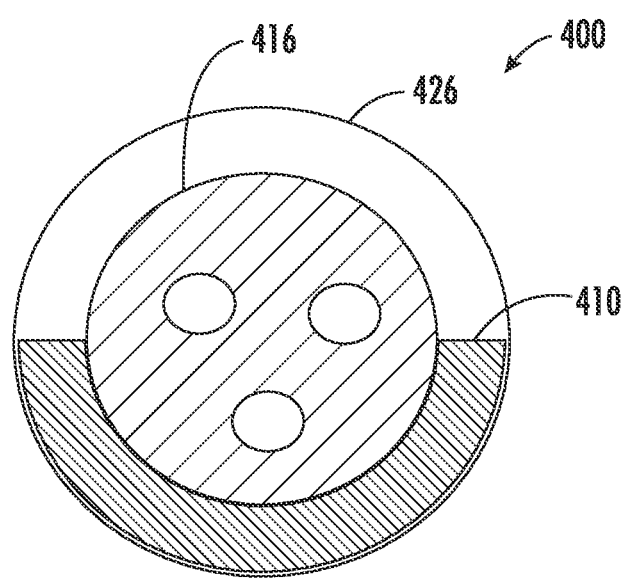
FIG. 4 illustrates a cross-sectional view of an exemplary suction tube device and ureteroscope combination according to an embodiment of the subject matter described herein.

In some embodiments, suction tube device 101 is designed so that flexible portion 116 may be used in tandem with device 101, for visualization and to maximize stone manipulation and removal. For example, FIG. 4 illustrates a cross-sectional view 400 of an exemplary suction tube device and ureteroscope combination according to an embodiment of the subject matter described herein. Notably, FIG. 4 illustrates that the flexible portion 416 of the ureteroscope can be inserted and/or positioned in close proximity to (e.g., on top of, on the bottom of, etc.) the U-Channel formation of the modified suction tube portion 410 of the suction tube device while both elements are contained within ureteral sheath 426 (e.g., similar to ureteral sheath 126 shown in FIGS. 1 and 2).

As indicated above, the combined system of modified suction tube portion 110 and the flexible portion 116 of ureteroscope device 102 can be inserted and/or placed individually in a retrograde fashion through the urethra, bladder, and ureter to the kidney 109 using a ureteral sheath 126 (e.g., modified suction tube portion 110 is inserted first, followed by the flexible portion 116 of ureteroscope device 102). In some embodiments, ureteral sheath 126 comprises a hollow sheath that is approximately 36 centimeters in length. In some embodiments, the size of the ureteral sheath may be a 11/13 French gauge ureteral sheath, a 13/15 French gauge ureteral sheath, or any other standard sized ureteral sheath. Referring to FIGS. 1 and 2, ureteral sheath 126 can be inserted into a patient's urethra 103, placed in the ureteral orifice and through the bladder (not shown), advanced up the ureter 105 and introduced into the renal pelvis area 107 of kidney 109 (see FIG. 2). In some embodiments, ureteral sheath 126 can be constructed of plastic, silicone, or any other flexible and/or pliable material without deviating from the scope of the disclosed subject matter. Although ureteral sheath 126 is depicted in FIGS. 1 and 2, suction tube device 101 can be configured and/or designed so that the suction tube device may be used without a ureteral sheath in place. In other embodiments, suction tube device 101 may be advanced over a guidewire (not shown) and positioned properly within the collecting system without the use of ureteral sheath 126.

After the ureteral sheath 126 is inserted into the patient body, a practitioner can first advance the suction tube device 101 up into the ureteral sheath 126 subsequently followed by flexible portion 116 of ureteroscope device 102. As indicated in FIG. 2, suction tube device 101 is advanced through ureteral sheath 126 until collection cylinder section (e.g., collection cylinder 120) exits the ureteral sheath.

In some embodiments, the width of collection cylinder 120 is just small enough in size to pass through the opening diameter of ureteral sheath 126. However, collection cylinder 120 may not be able to pass through ureteral sheath 126 if the flexible portion 116 of the ureteroscope device 102 has been previously inserted (and positioned within) ureteral sheath 126. Once collection cylinder 120 has exited ureteral sheath 126 and into kidney 109, the following length of suction tube device 101 (i.e., modified suction tube portion 110) that is currently positioned/residing within ureteral sheath 126 is "U-shaped" as previously described above and shown in FIG. 3 (e.g., tube section 302).

Figure 3:
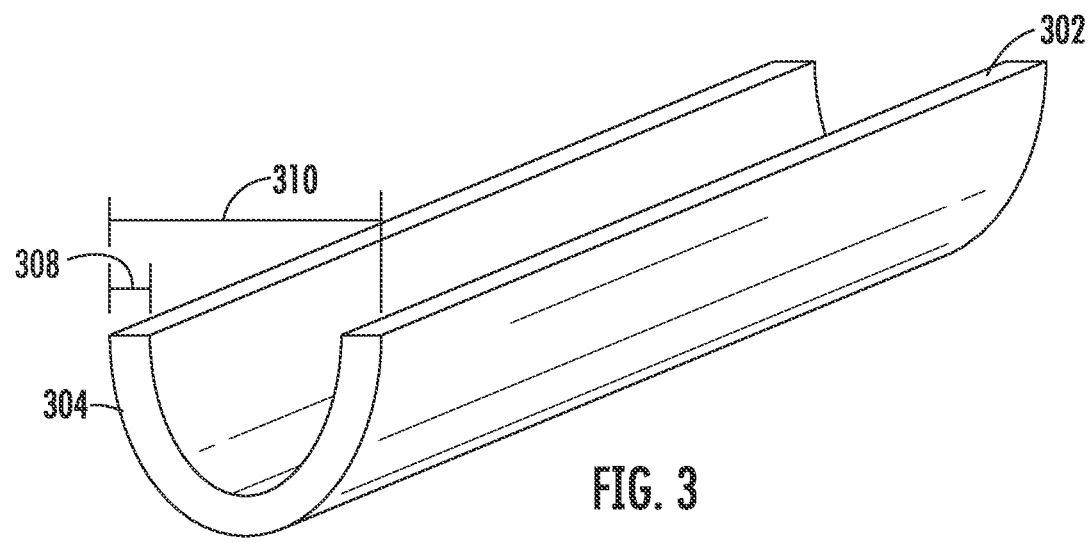
FIG. 3 illustrates a side view of an exemplary suction tube device according to an embodiment of the subject matter described herein.
Figure 5:
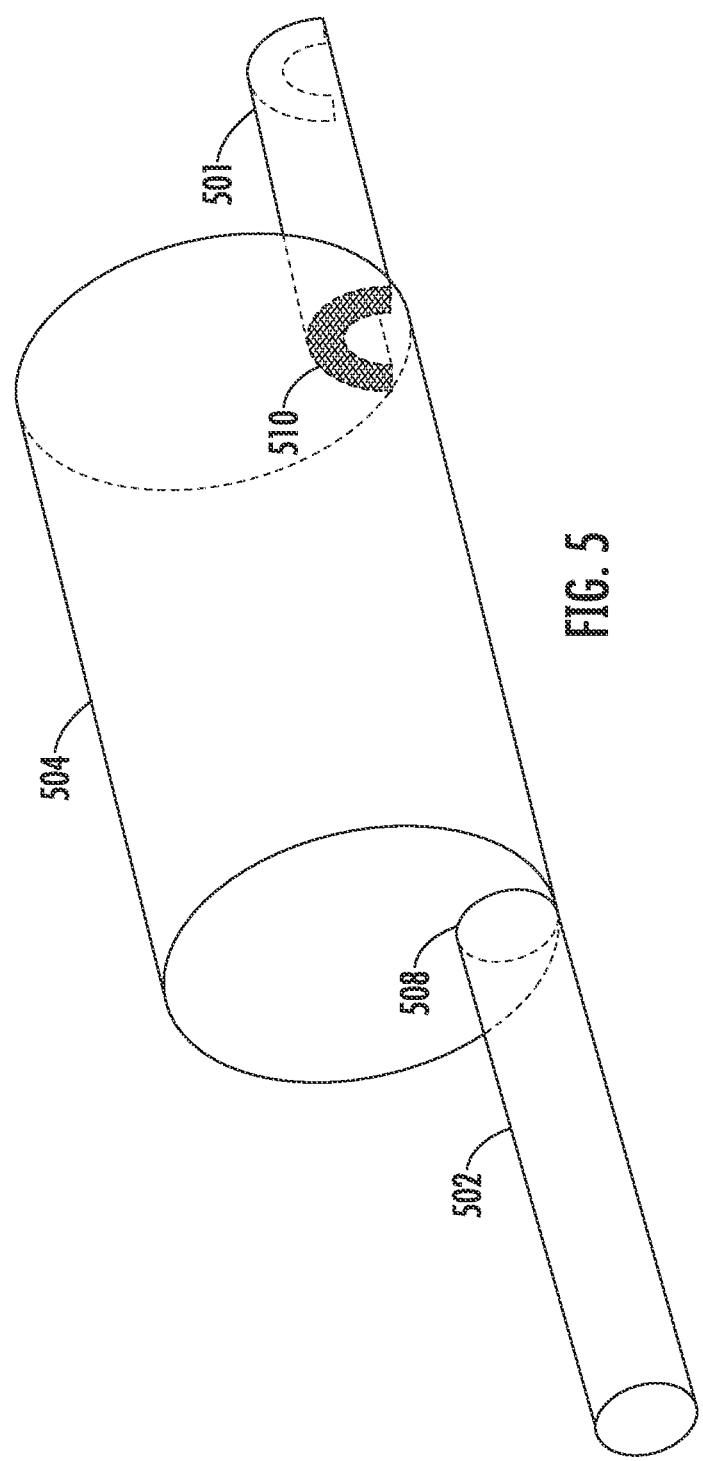
FIG. 5 illustrates an exemplary collection cylinder portion of a suction tube device according to an embodiment of the subject matter described herein.

As indicated above, FIG. 3 further illustrates that the U-shaped modified suction tube portion 110 of suction tube device 101 connects to or terminates at a corresponding U-shaped opening (or port) of collection cylinder 120. This is similarly depicted in FIG. 5. Notably, the connection point of modified suction tube portion 501 and collection cylinder 504 includes a mesh filter 510 (e.g., mesh filter 124 in FIG. 2). In some embodiments, mesh filter 510 may comprise any mesh intraluminal cross-section filter element that includes spacing or openings of 1 mm or less. These 1 mm openings prevent the passage of stone fragments greater than or equal to 1 mm through the U-shaped portion of the suction tube device, thereby preventing the U-shaped section of the suction tube device from becoming clogged or blocked with kidney stone particles. In some embodiments, collection cylinder 504 measures approximately 3.5 mm in width and 15 millimeters in length. However, collection cylinder 504 can be designed with any reasonable dimension that facilitates the collection and/or storage of kidney stone fragments and the insertion through and out of a ureteral sheath.

At the opposite end of the collection cylinder 504, which is positioned within the renal pelvis of the kidney, is an intra-renal portion 502 (i.e., portion 125 of the suction tube device 101 in FIG. 2). For example, collection cylinder 504 includes a circular opening or port 508 on this opposing end from the u-shaped opening (or port) of collection cylinder 504. As also shown in FIG. 2, intra-renal portion 125 of suction tube device 101 extends away from the collection cylinder 120 and is characterized as having a round and/or circular diameter (i.e., in contrast to U-shaped configuration of modified suction tube portion 110) until it terminates at an distal end opening 128.

In some embodiments, intra-renal portion 125 of the suction tube device 101 has an inside diameter of approximately 5 millimeters. The length of intra-renal portion 125 may be sized intraoperatively as needed to access the inside dimensions of the kidney 109 (see FIG. 2). Intra-renal portion 125 of the suction tube device 101 may also include side-port holes 132 (e.g., 1 mm diameter holes) to aid in suctioning kidney stone fragments 130 and prevent a complete suction blockage in the event a stone fragment completely covers or blocks distal end opening 128 of suction tube device 101. As described below, distal end opening 128 can be manually positioned within kidney 109 by an operator attempting to retrieve fragments 130 via suction.

As shown in FIG. 2, suction tube device 101 includes one or more magnet elements 122 that can be used to magnetically attach and/or connect to a distal portion of flexible portion 116 of ureteroscope device 102. In some embodiments, the distal portion of flexible portion 116 may include one or more magnet elements 123 that are integrated within ureteroscope device 102. In some embodiments, the intra-renal portion of the suction tube device 101 can be configured with one or more magnet elements 122, such that suction tube device 101 will attach loosely to the flexible tip of the ureteroscope via the one or more opposing magnet elements 123. Alternatively, the distal portion of flexible portion 116 can be equipped with a sleeve or attachment device that includes one or more magnet elements 123 configured to magnetically couple with the one or more magnets 122 on the suction tube device 101.

As the flexible tip of the ureteroscope is maneuvered by the operator within the collecting system of kidney 109, intra-renal portion 125 of suction tube device 101 may also be guided to direct the suctioning of kidney stone fragments 130. Attaching the suction tube device 101 in the aforementioned loose fashion allows the operator to easily detach the distal portion of flexible portion 116 of ureteroscope device 102 from intra-renal portion 125 of suction tube device 101, thereby leaving suction tube device 101 in place while ureteroscope device 102 is withdrawn from the patient body. As such, suction tube device 101 may subsequently be removed in an atraumatic manner (i.e., without damage to the kidney, ureter, etc.) with the captured kidney stone fragments 130 collected within the collection cylinder 120. Notably, collection cylinder 120 is configured to capture kidney stone fragments and particles that are greater than 1 millimeter in size (as defined by the opening of the mesh filter 124). Moreover, dust, fragments, and/or sand of size 1 millimeter or less passes through and out of collection cylinder 120 via mesh filter 124 and is ultimately collected by the aforementioned suction cannister positioned near the wall suction port.

Although FIG. 2 illustrates a viewpoint depicting the distal portion of flexible portion 116 positioned underneath intra-renal portion 125 of suction tube device 101, the distal portion of flexible portion 116 and intra-renal portion 125 can be arranged and connected in any manner conducive to the placement of magnet elements 122 and 123 without departing from the scope of the disclosed subject matter. For example, distal portion of flexible portion 116 can be positioned on top of intra-renal portion 125 of suction tube device 101. Likewise, distal portion of flexible portion 116 and intra-renal portion 125 can be readily positioned side-by-side.

Attachment of suction tube device 101 in this manner to the distal portion of flexible portion 116 also leaves the working ports of ureteroscope device 102 available in the event the operator intends to use a laser fiber, a stone basket, a camera, or other device to assist with stone manipulation. In some embodiments, the disclosed subject matter enables an operator to apply laser energy to a kidney stone (i.e., to fragment the stone(s)) while simultaneously utilizing the suction tube device 101 within kidney 109 to draw in stone fragments, dust, and the like. For example, with the suction tube device in place, a holmium laser fiber may be advanced through the ureteroscope and subsequently activated, thereby fragmenting stones while simultaneously utilizing the suction tube device for suctioning the stone particles/fragments.

In some alternate embodiments, the suction tube device can be integrated into ureteral sheath 126. For example, the suction tube device can be particularly configured and/or molded to include a U-shaped suction tube channel (e.g., hollow lumen channel) within the ureteral sheath, thereby rendering a single combined suction tube and ureteral sheath device that can accommodate a ureteroscope in a similar manner as described above.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A suction tube device comprising:
    a flexible tubing element comprising a modified suction tube portion characterized as having a U-shaped hollow lumen channel formation and an intra-renal portion characterized as having a circular shaped lumen channel; and
    an interface configured to attach the intra-renal portion to a distal tip of a ureteroscope device;
    wherein the intra-renal portion further includes a collection cylinder section configured for storing kidney stone fragments; and
    wherein a connection of the modified suction tube portion and the collection cylinder section includes a mesh filter element configured to prevent admittance of kidney stones into the modified suction tube portion of the flexible tubing element.

2. The suction tube device of claim 1 wherein each of the modified suction tube portion and the intra-renal portion is comprised of plastic or silicone.

3. The suction tube device of claim 1 wherein the flexible tubing element is configured to be inserted into a patient body via a ureteral sheath.

4. The suction tube device of claim 3 wherein the U-shaped hollow lumen channel formation is configured to receive the insertion and/or positioning of a flexible portion of a ureteroscope device within the ureteral sheath.

5. The suction tube device of claim 1 wherein the intra-renal portion of the flexible tubing element includes one or more magnet elements.

6. The suction tube device of claim 5 wherein the one or more magnet elements are configured to magnetically couple with opposing magnet elements positioned on the distal tip of the ureteroscope device.

7. The suction tube device of claim 1 wherein a surface of the intra-renal portion of the flexible tubing element includes one or more side-port openings to receive at least a portion of the kidney stone fragments and dust.

8. The suction tube device of claim 1 wherein suction applied to the flexible tubing element pulls the kidney stone fragments into the suction tube device.

9. The suction tube device of claim 1 wherein the kidney stone fragments include kidney stone dust and/or sand.

10. The suction tube device of claim 1 further including a manual shut off valve that is configured to cease suction in the flexible tubing element.

11. The suction tube device of claim 1 wherein the U-shaped hollow lumen channel formation is configured to receive the insertion and/or positioning of a flexible portion of a ureteroscope device.

* * * * *